*US006829592B1*

(12) United States Patent
Hasebe et al.

(10) Patent No.: US 6,829,592 B1
(45) Date of Patent: Dec. 7, 2004

(54) DATA PROTECTION SYSTEM, DATA PREPARATION DEVICE, AND DATA WORKING DEVICE

(75) Inventors: Takayuki Hasebe, Kawasaki (JP); Naoya Torii, Kawasaki (JP); Masahiko Takenaka, Kawasaki (JP); Souichi Okada, Kawasaki (JP); Yuji Kijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 153 days.

(21) Appl. No.: 09/000,924

(22) Filed: Dec. 30, 1997

(30) Foreign Application Priority Data

Jun. 11, 1997 (JP) .............................................. 9-154046

(51) Int. Cl.[7] .............................. G06F 17/21; H04L 9/00
(52) U.S. Cl. ........................ 705/51; 707/514; 707/516; 707/104.1
(58) Field of Search ................................ 705/400, 412, 705/51; 707/514–516, 104.1; 380/4, 25, 21, 3, 239, 241, 281

(56) References Cited

U.S. PATENT DOCUMENTS

| | | | | |
|---|---|---|---|---|
| 5,126,728 A | * | 6/1992 | Hall ............................ | 713/153 |
| 5,171,755 A | * | 12/1992 | Kaufman et al. ........... | 514/749 |
| 5,392,351 A | * | 2/1995 | Hasebe et al. ................ | 380/4 |
| 5,414,833 A | * | 5/1995 | Hershey et al. ............. | 713/201 |
| 5,473,687 A | * | 12/1995 | Lipscomb et al. ............ | 705/51 |
| 5,555,304 A | * | 9/1996 | Hasebe et al. ................ | 380/4 |
| 5,673,401 A | * | 9/1997 | Volk et al. ................... | 725/139 |
| 5,680,452 A | * | 10/1997 | Shanton ...................... | 713/167 |
| 5,687,331 A | * | 11/1997 | Volk et al. ................... | 345/840 |
| 5,761,651 A | * | 6/1998 | Hasebe et al. ............. | 705/400 |
| 5,765,152 A | * | 6/1998 | Erickson et al. ................ | 707/9 |
| 5,796,824 A | * | 8/1998 | Hasebe et al. ................ | 380/4 |
| 5,818,447 A | * | 10/1998 | Wolf et al. .................. | 345/752 |
| 5,832,083 A | * | 11/1998 | Iwayama et al. .............. | 380/4 |
| 5,872,926 A | * | 2/1999 | Levac et al. ................. | 709/206 |

FOREIGN PATENT DOCUMENTS

| | | | | |
|---|---|---|---|---|
| EP | 875868 A2 | * | 11/1998 | .......... G06K/19/73 |
| EP | 1018712 A1 | * | 7/2000 | ............ G06K/5/00 |
| JP | 8-185448 | | 7/1996 | |
| WO | WO 9744725 A2 | * | 11/1997 | .......... G06F/11/00 |
| WO | WO200064095 A1 | * | 10/2000 | ............. H04L/9/00 |
| WO | WO002065353 A1 | * | 8/2002 | ........... G06F/17/60 |

OTHER PUBLICATIONS

Sojoodi et al., PGPUB–Document–No.: 20020196285, Graphical program node for accessing capabilities of a software object, Dec. 6, 2002, see the summary of the invention.*

Slotznick, PGPUB–Document–No.: 20020112093, Method of processing information embedded in a displayed object, see the summary of the invention.*

Barton, Derwent–Acc–No.: 2000–663963, Embedded data authentication method for digital audio, video, & image data . . . , Sep. 5, 2000, see the abstract.*

From http://www.findarticles.com, ESPS introduces document management system . . . , PR Newswire, Dec. 21, 1999.*

(List continued on next page.)

*Primary Examiner*—Cuong Nguyen
(74) *Attorney, Agent, or Firm*—Staas & Halsey

(57) ABSTRACT

When a user works data required for allowance for the use thereof, the work processing is carried out by utilizing an exclusive work processing device. Thereafter, only the data of work information indicating what kind of working has been made to the original data (for example, differential static image data indicating a difference between the original static image required for allowance for the use and the static image after having been worked) is stored, whereby the use without permission of the data is prevented.

23 Claims, 11 Drawing Sheets

OTHER PUBLICATIONS

Sojoodi et al., PGPUB–Document–No.: 20020196285, Graphical program node for accessing capabilities of a software object, Dec. 6, 2002, see the summary of the invention.*

Slotznick, PGPUB–Document–No.: 20020112093, Method of processing information embedded in a displayed object, see the summary of the invention.*

Barton, Derwent–ACC–No.:2000–663963, Embedded data authentication method for digital audio, video, & image data . . . , Sep. 5, 2000, see the abstract.*

From http://www.findarticles.com, ESPS introduces document management system . . . , PR Newswire, Dec. 21, 1999.*

From http://www.findarticles.com, ESPS signs global license agreement with Merck KGaA, PR newswire, Apr. 13, 2000.*

From http://www.findarticles.com, ESPS announces compatibility of its CoreDossier(R) assembly & Publishing software with Lotus Note, PR Newswire, Apr. 7, 2000.*

Mcclure, VirusNet packs key scanning tools, InfoWorld, Dec. 21, 1998.*

From http://www.findarticles.com, New groupware system launched by MC2/Softarc, Telecomworldwire, Nov. 9, 1999.*

* cited by examiner

FIG. 7

DOCUMENT

Pleased to meet you,···

STATIC IMAGE
REQUIRED FOR
ALLOWANCE FOR
THE USE

STATIC IMAGE REQUIRED FOR ALLOWANCE FOR THE USE

STATIC IMAGE AFTER WORK PROCESSING

DIFFERENTIAL STATIC IMAGE (DATA OF WORK INFORMATION)

DATA PROTECTION SYSTEM, DATA PREPARATION DEVICE, AND DATA WORKING DEVICE

BACKGROUND OF THE INVENTION

1. Field of the Invention

The present invention relates to a data protection system for protecting data by preventing from use of data without permission in case of utilizing the data required for allowance for the use, i.e., the data the use of which is forbidden without permission.

2. Description of the Prior Art

Use without permission of data such as program data, and graphics-drawing data which was originally prepared by a user in a computer or the like, respectively, that is, the use by a third party of such data which must be essentially protected by copyright constitutes a social problem. With the development of advanced information network system, increase in such frequent use of data without permission is apprehended. A manner for utilizing a database is not only referred to the contents thereof, but also the acquired data is effectively utilized usually by storing, copying and working the same. Besides, it is also possible to transfer the data after having been worked to others via a communication line. Under the circumstances, it is an important problem to prevent from the use without permission of data which has been made as a database by what kind of manner.

Recently, a novel distribution system for distributing such data required for allowance for the use thereof is attracted because of the purpose thereof in preventing from the use without permission of the data. This distribution system is such system wherein data required for allowance for the use is widely distributed for easy availability by users, and a required charge is paid in response to the amount utilized by a user at the time when the acquired data is used by the user in reality, not but the time when the data is acquired by the user.

In the meantime, the OLE (Object Linking and Embedding) technique proposed by Microsoft Corporation and the like technique have been known as a manner for displaying the data prepared by other programs than a program wherein data linking procedure is adopted in accordance with the latter program. However, such OLE technique is essentially for the use of the data prepared by a user over different programs, but not the technique for the purpose of preventing use without permission of data. As a result, cut & paste processing is usually conducted with respect to data in such OLE technique. Since such cut & paste processing is the one being conflict with the prevention of use of data without permission, it is systematically impossible to forbid the use of data without permission by utilizing OLE technique.

On one hand, Japanese Patent Application Laid-Open 8-185448 (1996) has proposed such system wherein it is permitted to apply user's working to data required for allowance for the use thereof while protecting the data by copyright. In this system, the data supplied to each user from the database is distributed in the form of encrypted data, and the encrypted data is decoded by each user with the use of the decoding key acquired from a center in case of serving the data for user's utilization. Furthermore, this system adopts such a manner that when each user restores the data, encipherment is performed by a different key from the decoding key for the original data irrespective of the fact whether the data has been worked or not.

According to this system, there is such a fear that the data is stored without encipherment in the case when the data required for allowance for the use is restored by a user. Furthermore, the decoding key required at the time of restoring data is supplied from the reliable center, and such key must be different in all the users, so that there is such a problem that the preparation and control for keys in the center become complicated. Besides, when work processing of data is made several times, the processing for the decoding/encryption with use of decoding key at the time of restoring the data is necessary for the number of times corresponding to the number of times in the work processing. In this respect, this conventional system restricts such number of times to a certain number or less. However, there is also such a problem that when the number of times in work processing exceeds the restricted number of times, the user must again inform the center of that effect. In addition, it is impossible to discriminate that a questioned data is the one which has been worked by a user or the original data which has not yet been worked at the time of storing the data, so that it is supposed that the charge for the utilization of such data the use without permission of which is forbidden cannot be collected.

BRIEF SUMMARY OF THE INVENTION

An object of the present invention is to provide a data protection system and a data preparation device by which data required for allowance for the use can be utilized in the data prepared by a user himself (or herself) in the above-mentioned novel distribution system while preventing from the use without permission of the former data.

Another object of the present invention is to provide a data protection system and a data preparation device by which it is possible to prevent from the illegal utilization of data required for allowance for the use due to the cut & paste processing of the data.

A further object of the invention is to provide a data protection system and a data working device which are adapted in such that only the data of work information indicating what kind of working has been made on data required for allowance for the use after such original data was worked by a user is stored, whereby the use without permission of the original data can be prevented by a mechanism which functions at the time when work processing is applied to the data required for allowance for the use by a user.

A yet further object of the invention is to provide a data protection system wherein such data of work information indicating what kind of working has been made upon the original data or such worked data obtained by a user as a result of working data required for allowance for the use by the user himself (herself) may be allowed to distribute as novel data required for allowance for the use and the use without permission of which is forbidden.

In the data protection system according to the present invention, when such data required for allowance for the use is utilized in the data prepared by a user himself (herself) without accompanying any working, information relating to the data required for allowance for the use (link information) is incorporated in the data to be prepared by the user to display the same, and on the other hand, it is adapted in, such that the cut & paste function with respect to the data required for allowance for the use cannot be utilized, and a function for restoring the data required for allowance for the use cannot be performed. As described above, when the cut & paste function with respect to the data required for allowance for the use is forbidden and the data required for allowance for the use is allowed to be displayed by the use of the link information of the data, it becomes possible to embed the data required for allowance for the use in the data prepared by the user himself (herself) while preventing from the use without permission of the former data.

In the data protection system according to the present invention, it is arranged in such that when such data required for allowance for the use is worked, only an exclusive work processing unit can be utilized, while the data of work information indicating what kind of working has been made by a user himself (herself) such as differential data obtained from the original data required for allowance for the use and the data worked by the user can be stored in the case when the data worked in the exclusive work processing unit is stored in a storage medium, but either of the original data required for allowance for the use and the data after having been worked by the user cannot be stored as it stands. As described above, when the data protection system is arranged in such that work processing is conducted in the exclusive work processing unit, and only the resulting data of work information is stored, the data of work information prepared by a user himself (herself) can be utilized without any restriction, but the original data required for allowance for the use can be merely used with a certain restriction, whereby the use without permission of the original data can be prevented.

When the data of work information once stored is read and the data of work information thus read is added to the original data required for allowance for the use, it is possible to redisplay the data at the time of the preceding working. Furthermore, if the data protection system has been arranged in such that when the data of work information is stored, such information for specifying the original data required for allowance for the use being corresponding to this data of work information is added thereto and the resulting information is also stored at that time, it becomes possible to redisplay the data at the time of the preceding working by only specifying the data of work information. Moreover, it is also possible to make this data of work information distributive as such data required for allowance for the use by the center and the use without permission of which is forbidden. Alternately, it is also possible that such data after having been worked as it stands can be stored in the center, and that the data after having been worked as it stands is allowed to distribute as data required for allowance for the use and the use without permission of which is forbidden by the center by utilizing the original data required for allowance for the use and one of the work information.

Meanwhile, when such data required for allowance for the use is utilized, the data protection system is arranged in such that it is checked whether or not there is a license for the utilization, and the image of the data can be displayed in only the case where there is the license, while the utilization is forbidden in the case where there is no license. Furthermore, the system is adapted in such that when a user's balance is used for such license, the payment for charge can be assured in response to the amount used for data required for allowance for the use thereof.

The above and further objects and features of the invention will more fully be apparent from the following detailed description with the accompanying drawings.

BRIEF DESCRIPTION OF THE SEVERAL VIEWS OF THE DRAWINGS

FIG. 7 is a view illustrating a displaying example wherein a static image required for allowance for the use thereof is embedded in a document;

DETAILED DESCRIPTION OF THE INVENTION

The invention will be described in detail hereinafter by referring to the accompanying drawings illustrating the embodiments thereof.

Figure 1:
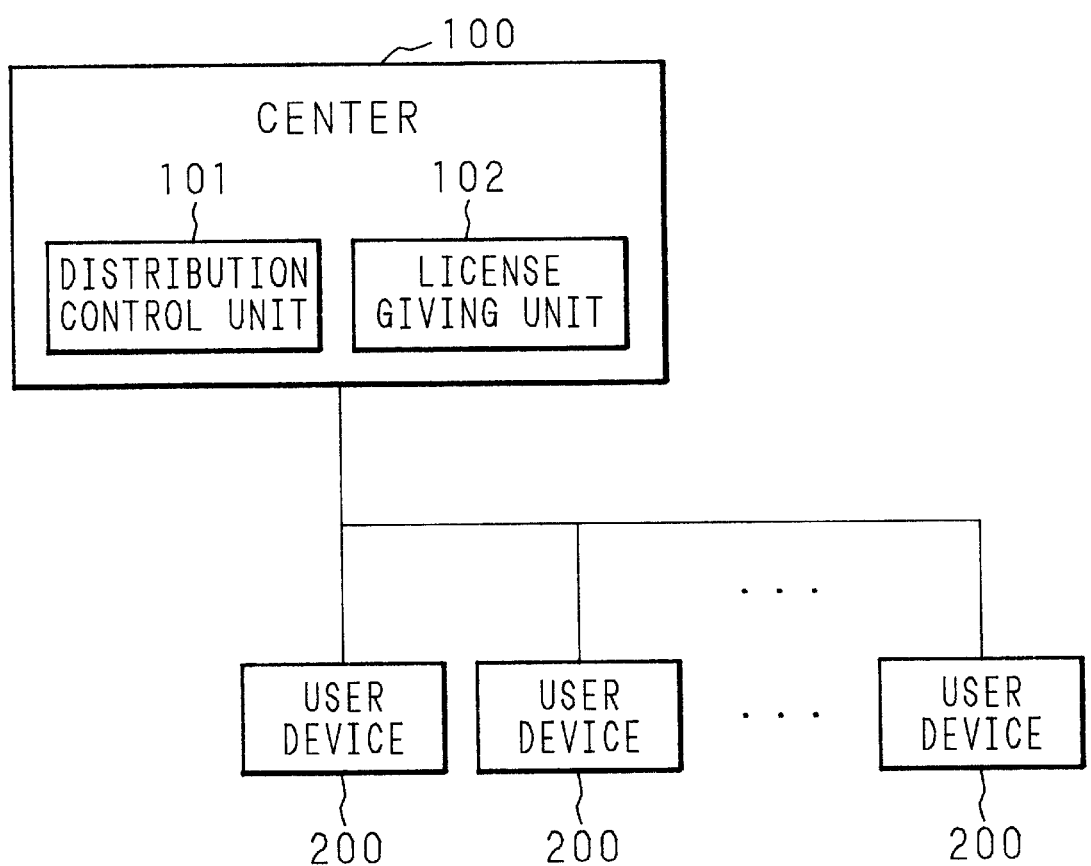
FIG. 1 is a schematic diagram showing a distribution mechanism for data required for allowance for the use thereof.

FIG. 1 is a schematic diagram showing a mechanism for distributing data required for allowance for the use wherein reference numeral 100 designates a reliable center to which are connected user devices 200 each of which is for the use of data required for allowance for utilizing the same by a user through a communication line. The center 100 includes a distribution control unit 101 for controlling the distribution of the data required for allowance for the use and a license giving unit 102 for giving the license for allowance of using the data required for allowance for the use to the respective user devices 200. The center 100 furnishes a user device 200 with a decoding key as the license for decoding encrypted data in case of completing the payment for charge by the user device 200, and delivers the encrypted data required for allowance for the use to the user device 200 in case of being demanded thereby. The user device 200 decodes the encrypted data by means of the decoding key to utilize the delivered data.

First Embodiment

Figure 2:
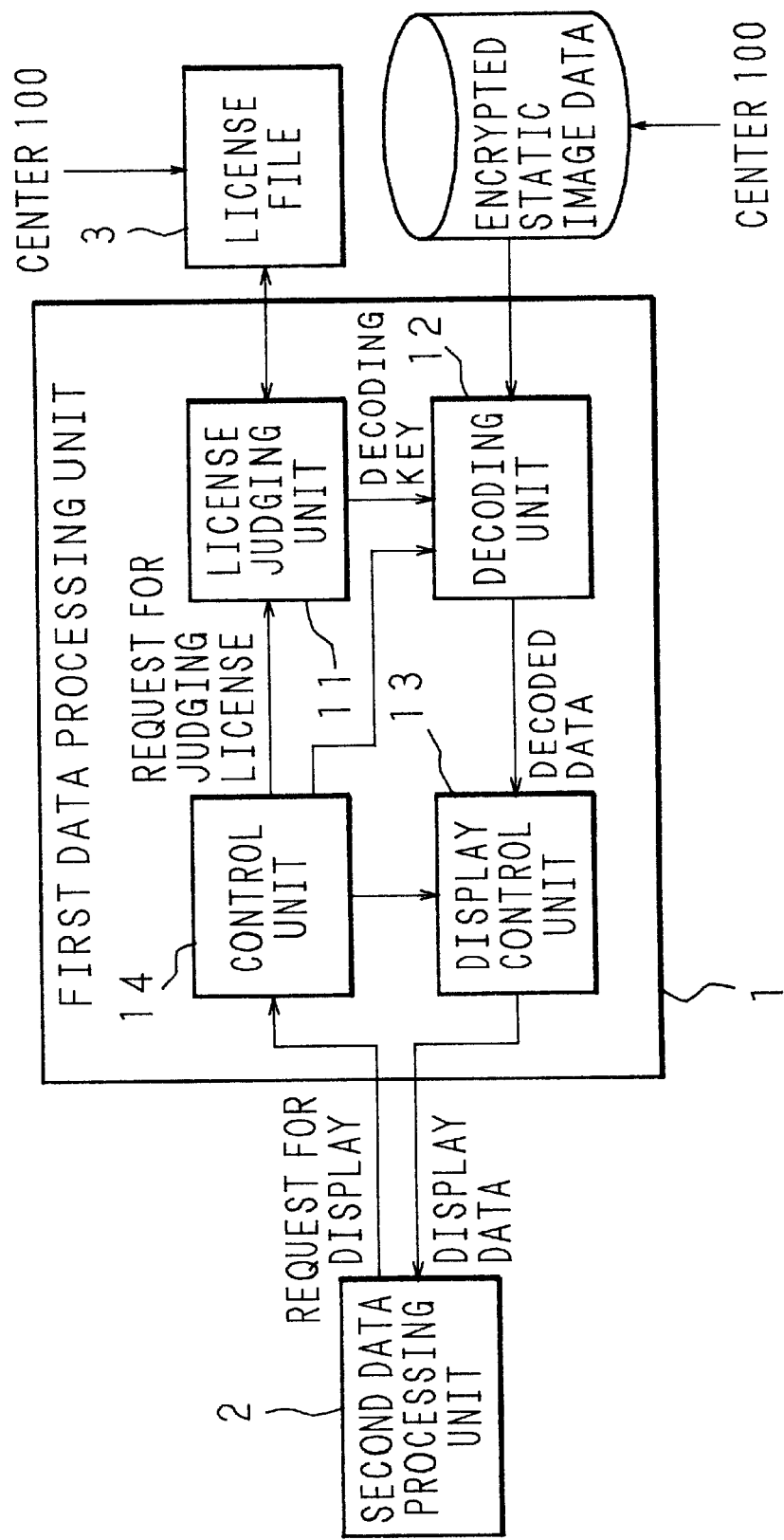
FIG. 2 is a constitutional diagram showing a data protection system according to a first embodiment of the invention.

FIG. 2 is a constitutional diagram showing the data protection system according to the first embodiment of the present invention wherein the data protection system of the first embodiment comprises a first data processing unit 1 for conducting processes such as checking for license, and decoding for the encrypted data required for allowance for the use which will be described hereunder; a second data processing unit 2 for performing processes such as preparation of document data, and display for the prepared data which will be described hereunder; and a license file 3 for storing licenses.

The first data processing unit 1 includes a license judging unit 11 for judging whether or not the use of data required for allowance for the use is permitted on the basis of licenses stored in the license file 3; a decoding unit 12 for decoding the encrypted data required for allowance for the use; a display control unit 13 for controlling to display the data required for allowance for the use on the second data processing unit 2; and a control unit 14 for controlling these license judging unit 11, the decoding unit 12 and the display control unit 13 based on the request for display from the second data processing unit 2, as well as for forbidding the storage function and the cut & paste function with respect to the data required for allowance for the use.

Figure 3:
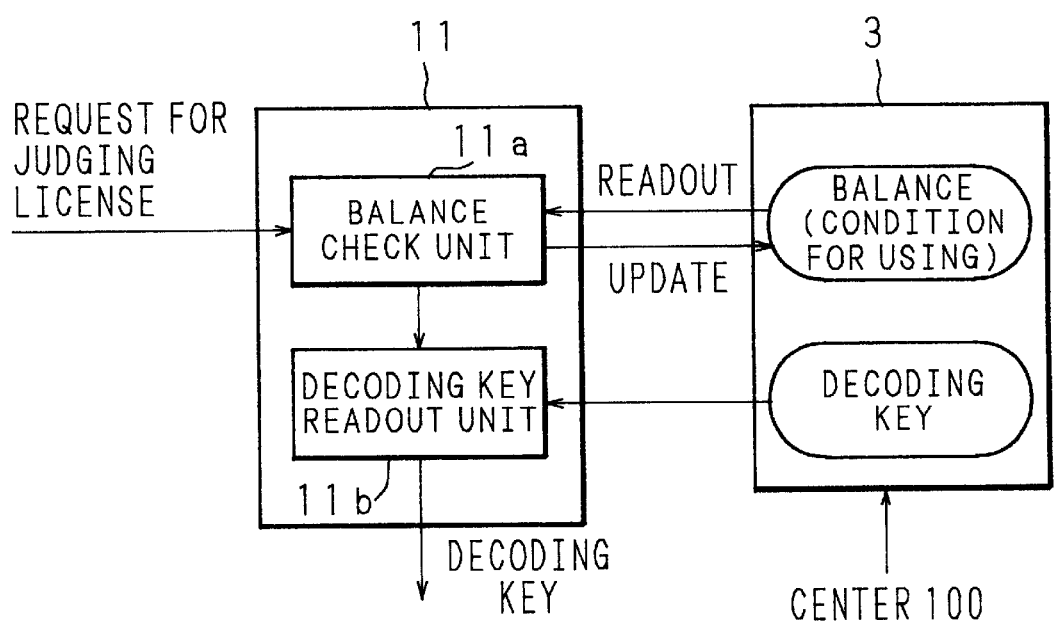
FIG. 3 is a constitutional diagram showing a license judging unit.

FIG. 3 is a block diagram showing the constitution of the license judging unit 11 wherein the license judging unit 11 has a balance check unit 11a and a decoding key readout unit 11b. The license file 3 contains each balance for charge being a condition for use in case of giving a license and each decoding key given by the center 100. In this case, these balances and decoding keys may be encrypted or may not be encrypted. When a request for judging license is delivered to the license judging unit 11 from the control unit 14, the balance check unit 11a reads the balance to judge whether or not the use of the data required for allowance for the use is possible after decoding the balance and the key, if they have been encrypted. As a result, when the balance satisfies the condition for use, the balance check unit 11a reduces the balance by the amount corresponding to the price required for the use. Thereafter, the decoding key readout unit 11b reads the decoding key to send the decoding key to the decoding unit 12 after decoding the decoding key, if it has been encrypted.

The decoding unit 12 decodes the encrypted data required for allowance for the use by means of this decoding key, and the resulting decoded data is outputted to the display control unit 13. The display control unit 13 controls the second data processing unit 2 so as to display the image corresponding to the decoded data.

Figure 4:
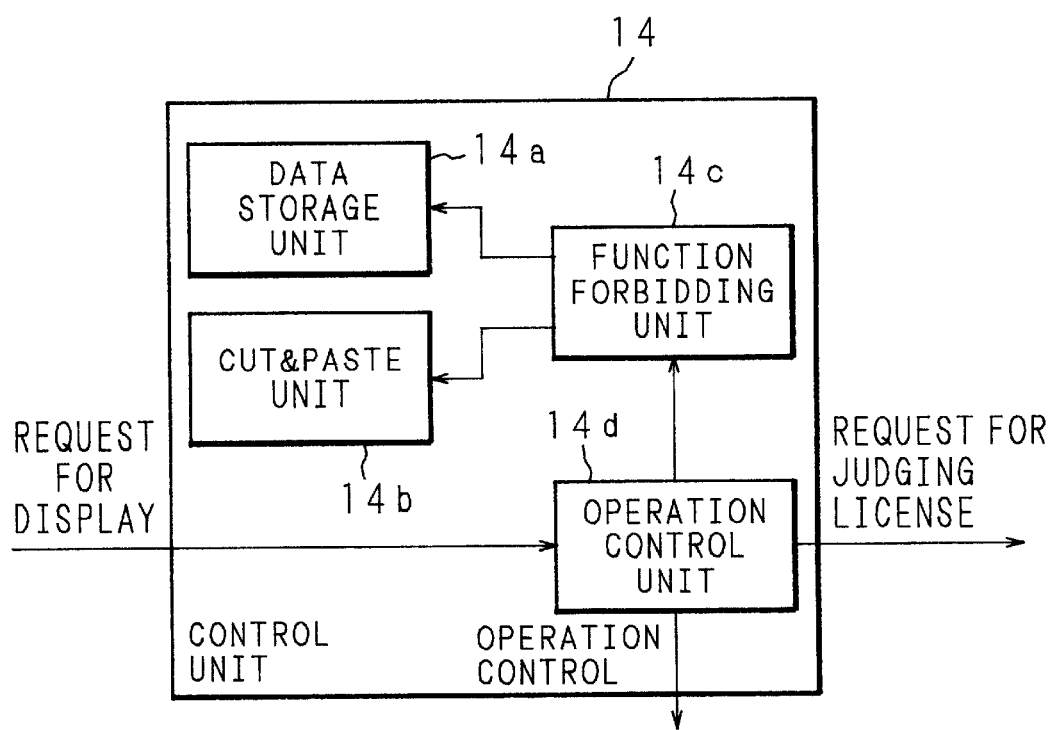
FIG. 4 is a constitutional diagram showing a control unit.

FIG. 4 is a block diagram showing the constitution of the control unit 14 wherein the control unit 14 has a data storage unit 14a for storing input data, a cut & paste unit 14b for executing cut & paste manipulation with respect to the input data, a function forbidding unit 14c for forbidding the functions of these data storage unit 14a and the cut & paste unit 14b in the case where the input data is the one required for allowance for the use, and an operation control unit 14d for judging whether or not the input data is the one required for allowance for the use as well as for controlling operations in the license judging unit 11, the decoding unit 12 and the display control unit 13. The control unit 14 is arranged in such that when data which is not required for special allowance for use, i.e., data the use without permission of which is not specifically forbidden is inputted, the data storage unit 14a and the cut & paste unit 14b operate with respect to the inputted data to be capable of performing a usual storing function and cut & paste function, while these storing and cut & paste functions are forbidden by the function forbidding unit 14c in the case when such data required for allowance for the use, i.e., data the use of which is forbidden without permission is inputted.

Figure 5:
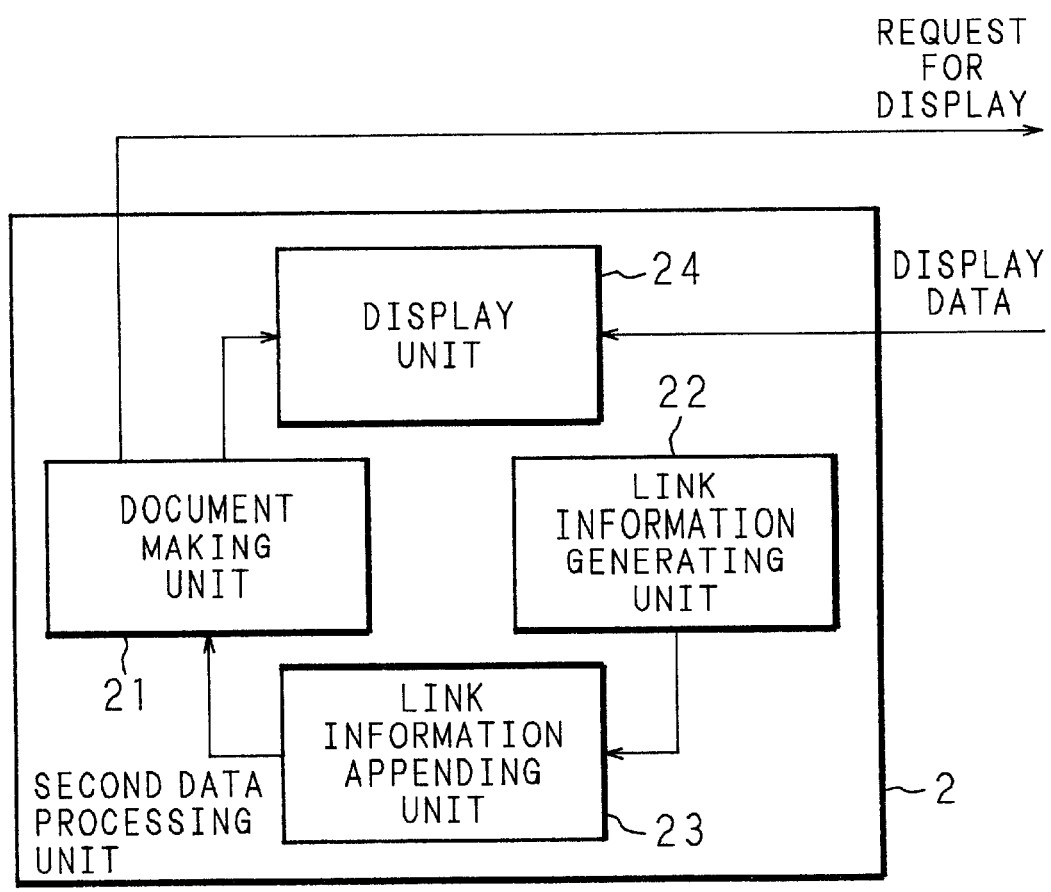
FIG. 5 is a constitutional diagram showing a second data processing unit.

FIG. 5 is a block diagram showing the constitution of the second data processing unit 2 wherein the second data processing unit 2 has a document making unit 21 for making the document on the basis of the input from a user, a link information generating unit 22 for generating the information (link information) relating to data required for allowance for the use, a link information appending unit 23 for appending the generated link information to the made document, and a display unit 24 for displaying the image corresponding to the document to which has been appended the link information and the above described decoded data.

In operation, an example of the case where the static image corresponding to static image data required for allowance for the use is embedded in a document made by a user will be described hereinafter.

Figure 6:
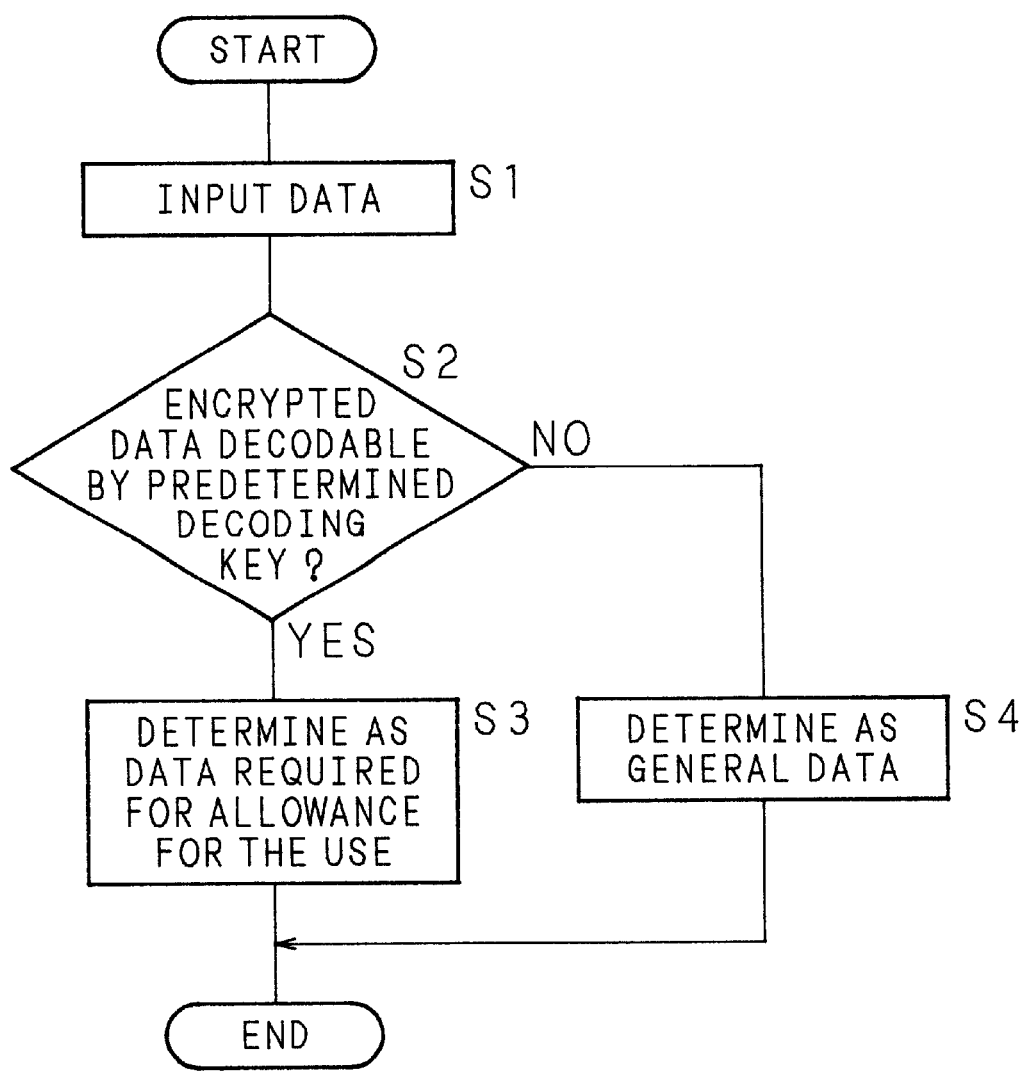
FIG. 6 is a flowchart showing a procedure for judging data required for allowance for the use thereof.

First, it is judged whether or not inputted data is the one required for allowance for the use. FIG. 6 is a flowchart illustrating a procedure for the judging process carried out in the operation control unit 14d wherein data is first inputted (S1), and it is judged whether or not the data is the encrypted data being decodable by means of a predetermined decoding key given by the center 100 (S2). In the case when the input data is the encrypted data satisfying such condition as described above (S2: YES), it is determined that the data is the one required for allowance for the use (S3). On the other hand, when the input data does not satisfy the above condition (S2: NO), it is determined that the input data is general data (S4). In the case where the input data is general data, the input data can be stored in the data storage unit 14a without any modification and cut & paste manipulation can be made also with respect to the input data by means of the cut & paste unit 14b, while no storage processing and no cut & paste manipulation as described above can be made by the function forbidding unit 14c, when the input data is the one required for allowance for the use.

In the case when it is intended to use such static image data required for allowance for the use, a request for display is outputted to the control unit 14 (the operation control unit 14d) in the first data processing unit 1 from the second data processing unit 2 (the document making unit 21), and a request for judging license is outputted to the license judging unit 11 from the control unit 14 in response to the request for display. The balance check unit 11a reads the balance from the license file 3, and it is judged whether or not the balance does satisfy the condition for use, whereby it is determined whether or not the desired static image data required for allowance for the use can be utilized. If possible, the decoding key is read from the license file 3 into the decoding key readout unit 11b, and the decoding key is sent to the decoding unit 12.

In the decoding unit 12, the encrypted static image data required for allowance for the use is decoded by utilizing this decoding key, and the data thus decoded is sent to the second data processing unit 2 through the display control unit 13 to display the static image corresponding to the sent data. In this case, the display function may be realized by the application of either a function such as the OLE technology as mentioned above or any other functions.

FIG. 7 is a diagram showing an example which is displayed in such a mode wherein a static image required for allowance for the use is embedded in a document without any modification in which at least such information for specifying the original static image data required for allowance for the use and the information for the position in display is appended to the document information as the link information for embedding the static image required for allowance for the use into a document to be made.

As described above, there is no cut & paste function with respect to the data required for allowance for the use in the first data processing unit 1, so that such image without any modification as a result of adding no processing of deletion and addition is embedded in a document. Furthermore, the first data processing unit 1 is adapted in such that data required for allowance for the use cannot be stored again therein. Accordingly, when such data is intended to be used again, it is necessary that a series of processes starting from the license check must be repeated again to acquire the data required for allowance for the use. Moreover, the charge is positively paid on all such occasions where data required for allowance for the use is utilized. Thus, in accordance with the system configuration as described above, a user can embed such data required for allowance for the use in the document made by the user himself (or herself) while the system prevents from use without permission.

Although the case where a static image required for allowance for the use is embedded in a document to display the same has been mentioned in the above described example, it is also possible to display such static image required for allowance for the use in a separate window, but not in a document. In this case, there is no need of specifying particularly the position in display.

Second Embodiment

Figure 8:
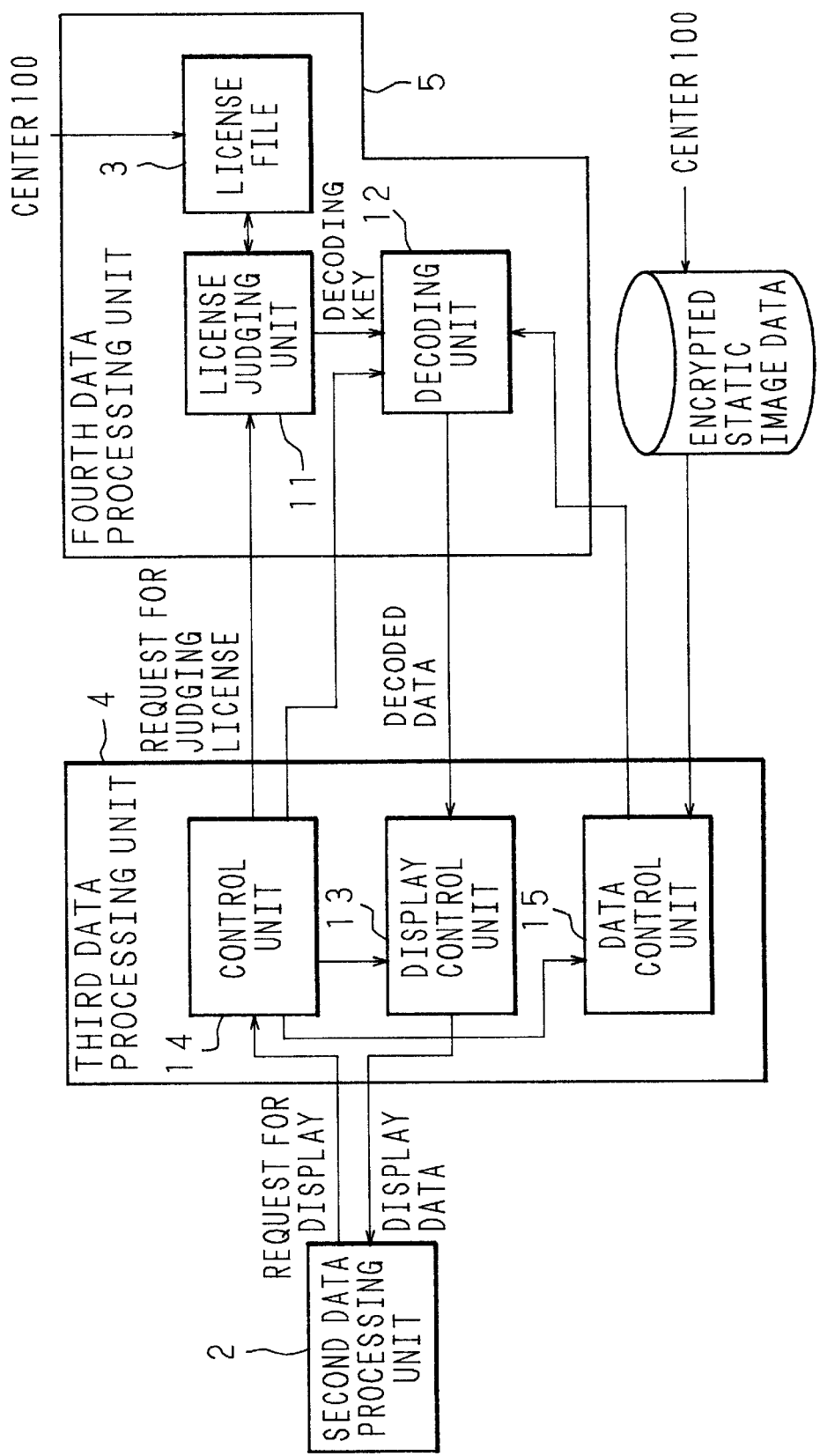
FIG. 8 is a constitutional diagram showing a data protection system according to a second embodiment of the present invention.

FIG. 8 is a constitutional diagram showing the data protection system according to the second embodiment of the present invention. While an example wherein processing of checking license and that of decoding encrypted data are conducted in software has been described in the above-mentioned first embodiment, the second embodiment has a constitution wherein the processings of them are carried out in external hardware (a fourth data processing unit 5 of FIG. 8). The data protection system of the second embodiment comprises a third data processing unit 4 provided with the same display control unit 13 and the same control unit 14 as those of FIG. 2, and a data control unit 15 to which static image data required for allowance for the use is inputted to deliver the input data to a decoding unit 12; the same second data processing unit 2 as that of FIG. 2; and a fourth data processing unit 5 provided with a license judging unit 11, a decoding unit 12 and a license file 3 those of which have the same functions as those of FIG. 2.

Since the operations of the second embodiment are essentially the same as those of the above-mentioned first embodiment shown in FIG. 2, the explanation therefor will be omitted. In also the second embodiment, it is possible to embed such data required for allowance for the use in a document made by a user himself (herself), while the system prevents from the use of the data without permission by any user.

Meanwhile, although such a case where a static image required for allowance for the use is utilized for embedding it in a document made by a user himself (herself) has been described in the above-mentioned first and second embodiments, the present system can be, as a matter of course, applied to materials other than the document with embedding of data other than the static image.

Third Embodiment

Figure 9:
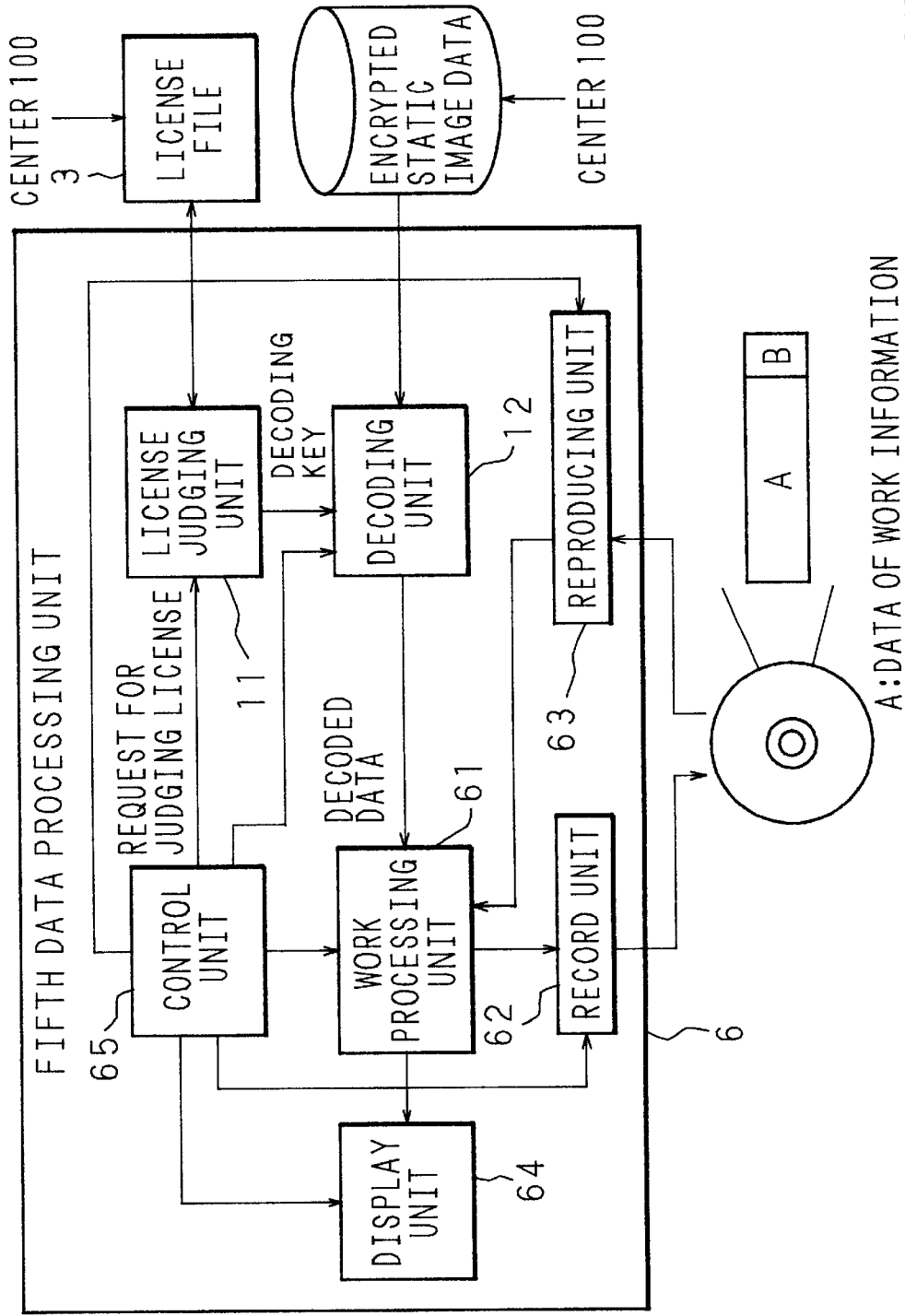
FIG. 9 is a constitutional diagram showing a data protection system according to a third embodiment of the present invention.

The third embodiment wherein work processing can be made by a user with respect to such data required for allowance for the use will be described. FIG. 9 is a constitutional diagram showing the data protection system according to the third embodiment of the present invention. The data protection system of the third embodiment comprises a fifth data processing unit 6 which performs processing for checking license, decoding encrypted data required for allowance for the use, working data required for allowance for the use, writing/reading data of work information which will be described hereunder, and the like processing; a storage medium 7 for storing the data of work information; and the same license file 3 for storing licenses as that of FIG. 2.

The fifth data processing unit 6 has the same license judging unit 11 and decoding unit 12 as those of FIG. 2, a work processing unit 61 for working data required for allowance for the use, a record unit 62 for writing such information data (the data of work information) by which it is clear what kind of working has been made upon the data required for allowance for the use into the storage medium 7, a reproducing unit 63 for reading the data of work information which has been stored in the storage medium 7, a display unit 64 for displaying the image at the time of working, and a control unit 65 for controlling these license judging unit 11, the decoding unit 12, the work processing unit 61, the record unit 62, the reproducing unit 63, and the display unit 64.

In operation, such a case where static image data required for allowance for the use is worked, and a differential static image data obtained by comparing the original static image data required for allowance for the use with the static image data after applying the working process onto the original static image data is utilized as the data of work information will be described hereinafter.

In the case where it is intended to work such static image data required for allowance for the use, a request for judging license is outputted to the license judging unit 11 from the control unit 65. The balance check unit 11a reads the balance in the license file 3, and then it is judged whether or not the balance satisfies the condition for use. As a result, it is determined whether or not utilization of a desired static image data required for allowance for the use is possible. If possible, the decoding key readout unit 11b reads a decoding key from the license file 3, and the decoding key thus read is sent to the decoding unit 12. In the decoding unit 12, encrypted static image data required for allowance for the use is decoded by means of the decoding key. Such operations in the license judging unit 11 and the decoding unit 12 are the same as those of the above-mentioned first embodiment.

Figure 10A:
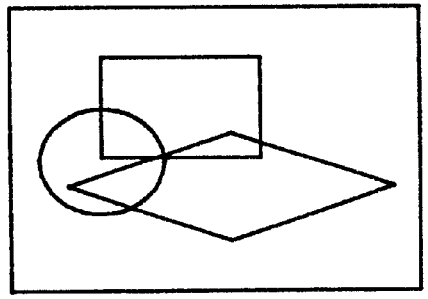
FIG. 10A is a view showing a static image required for allowance for the use thereof.
Figure 10B:
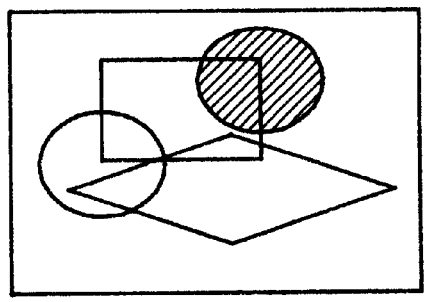
FIG. 10B is a view showing a static image after which has been worked.

The decoded static image data is inputted to the work processing unit 61. An example of the original static image required for allowance for the use is illustrated in FIG. 10A wherein other data is applied to the original static image in accordance with the inputting operation by a user in the work processing unit 61. An example of the static image after working is illustrated in FIG. 10B wherein a hatched portion indicates a region which has been worked. Such work processing with respect to the data required for allowance for the use can only be made in the exclusive fifth data processing unit 6.

Figure 10C:
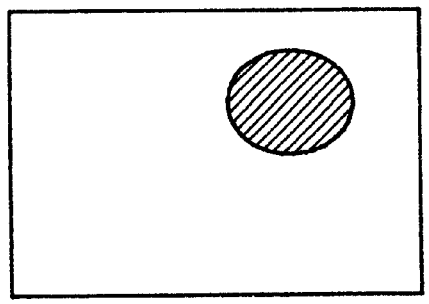
FIG. 10C is a view showing an example of the data of work information.

After completing the work processing, a differential static image data exhibiting a difference between the original static image required for allowance for the use and the static image after working as shown in FIG. 10C is written into the storage medium 7 by means of the record unit 62. In this case, however, the static image after working cannot be stored as it stands.

In the case where further work processing is intended to resume the preceding work processing, the steps as mentioned above are again repeated, namely, the license is checked, then, the encrypted static image data required for allowance for the use is decoded, and the decoded static image data is inputted to the work processing unit 61. On one hand, the preceding differential static image data which has been stored in the storage medium 7 is loaded into the work processing unit 61 by means of the reproducing unit 63. Thereafter, the original static image data is synthesized with the preceding differential static image data, so that the static image after the application of the preceding work processing in response to the resulting synthesized data (the static image as shown in FIG. 10B) is displayed on the display unit 64. As a result, the work processing of this time can follow the preceding work processing.

As described above, such data of work information indicating what kind of working has been made upon the original data required for allowance for the use can be stored after completing the work processing, but it is adapted in such that the original data itself required for allowance for the use as well as the data after the working itself cannot be stored. In other words, it is free to utilize the worked information by a user himself (herself), but it is impossible to freely handle the original data required for allowance for the use as well as the data after having been worked, so that it becomes possible to prevent from use of data without permission. Furthermore, when the data of work information which has been once stored and is read this time is added to the original data required for allowance for the use which has been inputted again, the data at the time of the preceding work processing can easily be redisplayed on the display unit 64.

In the meantime, when it is arranged in such that such information for specifying the data to be worked which is required for allowance for the use is also added to the data of work information in the case when the data of work information is written into the storage medium 7, it becomes possible to redisplay the image on the display unit 64 at the time of the preceding work processing as a result of inputting automatically the corresponding data required for allowance for the use by only specifying the data of work information.

Moreover, it is also possible that such data of work information is allowed to distribute as the data required for allowance for the use by the center 100 and the use without permission of which is forbidden. In this case, since this data of work information must be prevented also from the use without permission, the respective processing for checking the license and that for decoding the data are required, as in the case of utilizing the original data required for allowance for the use, in the case when users other than the user who has worked the data by himself (herself) desire to use the data of work information.

Fourth Embodiment

Figure 11:
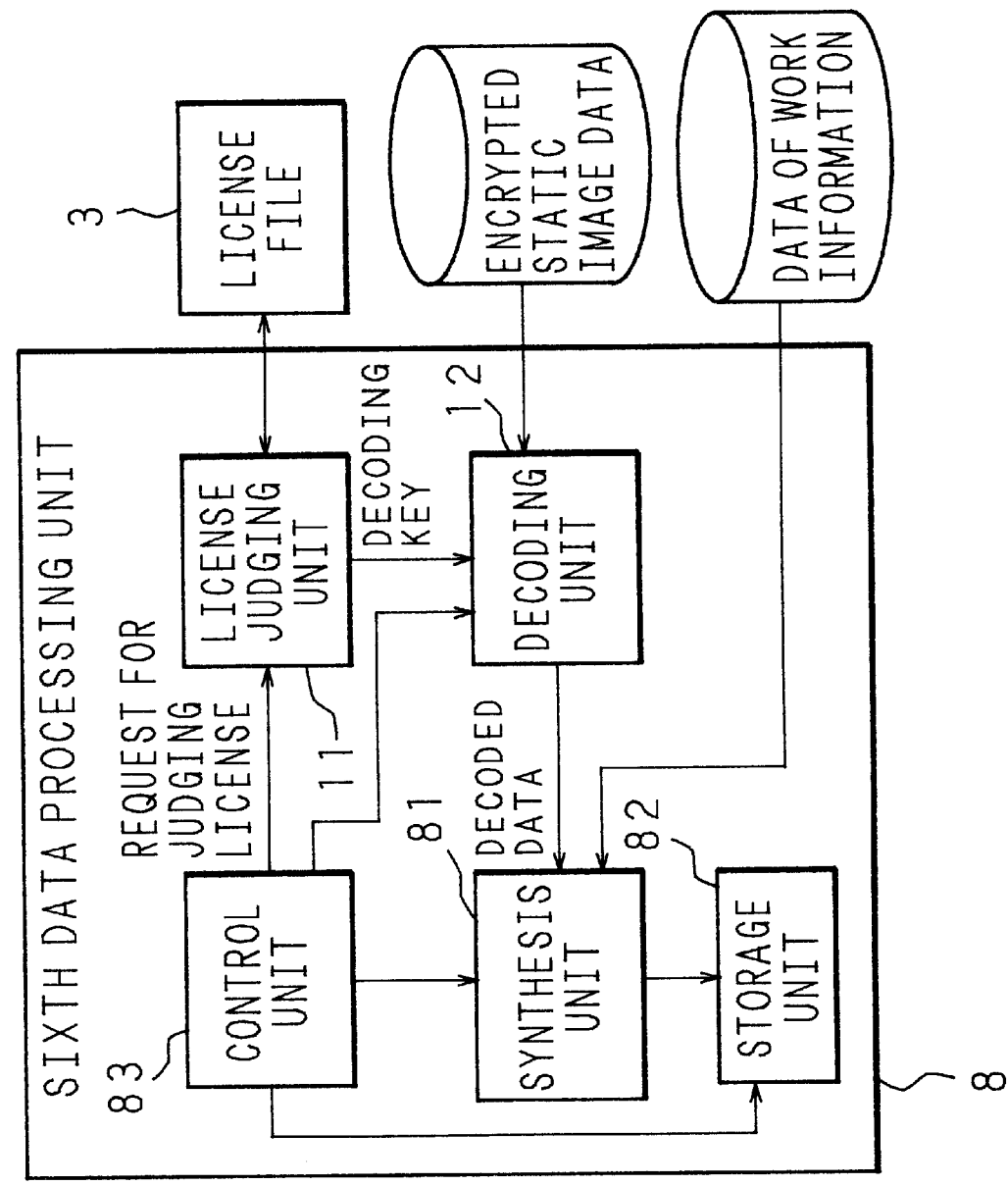
FIG. 11 is a constitutional diagram showing a data protection system according to a fourth embodiment of the present invention.

In the following, the fourth embodiment wherein the data after working is allowed to distribute such data which is required for allowance for the use and use without permission of which is forbidden will be described. FIG. 11 is a constitutional diagram showing the data protection system according to the fourth embodiment according to the present invention. This data protection system of the fourth embodiment comprises a sixth data processing unit 8 which is exclusively used for the center and performs synthesis of data required for allowance for the use with the data of work information, storage for the data after synthesis, and the like processing; and the same license file 3 as that of FIG. 2 for storing licenses.

The sixth processing unit 8 has the same license judging unit 11 and decoding unit 12 as those of FIG. 2, a synthesis unit 81 for synthesizing such data which is decoded in the decoding unit 12 and required for allowance for the use with the data of work information inputted from the outside, a storage unit 82 for storing the data after synthesis, and a control unit 83 for controlling these license judging unit 11, decoding unit 12, synthesis unit 81 and storage unit 82.

In operation, such a case wherein static image data indicating a difference between the original static image data required for allowance for the use and the static image data after completing the work processing is inputted, then, the inputted data is added to the original static image data required for allowance for the use to obtain the static image data after the work processing, and the resulting static image data after the work processing is allowed to distribute will be described hereunder.

As in the other embodiments mentioned above, when a balance satisfies the condition for utilizing static image data required for allowance for the use, the decoding key is read, so that the encrypted static image data required for allowance for the use is decoded by means of the decoding key. The static image data thus decoded (FIG. 10A) is sent to the synthesis unit 81. Differential static image data (data of work information) (FIG. 10C) is inputted to the synthesis unit 81 by a user who has completed the work processing. The static image data after decoding and required for allowance for the use is synthesized with the inputted differential static image data in the synthesis unit 81. The static image data thus synthesized (FIG. 10B) is sent to the storage unit 82 and stored therein.

As described above, the sixth data processing unit 8 used exclusively for the center in the fourth embodiment differs from the other processing units utilized by a user. More specifically, there is no restriction as the data to be stored, so that the sixth data processing unit 8 has general storing functions. In other words, static image data after having been worked can be stored as it stands in the sixth data processing unit 8. For instance, if the data is bitmap data, the data after having been worked can be stored in its bitmap condition.

Thereafter, when such synthesized static image data, i.e., the static image data after working is encrypted to prepare novel static image data required for allowance for the use, the resulting data can be allowed to distribute as data required for allowance for the use and the use without permission of which is forbidden.

While the step for checking a license has been required as in the case of general users in the above described example, it may be constituted without accompanying the step for checking a license, because the sixth data processing unit 8 is exclusively used for the center. Furthermore, although encrypted static image data required for allowance for the use has been decoded as in the case of general users in the above described example, such decoding processing is not required if the center itself has stored the original static image data which had not yet been encrypted.

In addition, while such a case where differential static image data which is obtained from the original static image data required for allowance for the use and the static image data after working is utilized as the data of work information has been described in the above-mentioned third and fourth embodiments, data other than the differential data as described above may, of course, be also used as the data of work information so far as they are the data from which what kind of working had been applied thereto can be known therefrom. As a matter of course, such data required for allowance for the use is not limited to static image data.

Besides, while the data required for allowance for the use has been protected by encipherment in all the embodiments described above, there is no problem even if the data has been protected by other mechanisms than the encipherment such as compression, particular format and the like. Accordingly, any mechanism may be adopted as far as the data cannot be utilized in units or means contained in the mechanism other than the data processing unit corresponding to the system according to the present invention.

As mentioned above, since the present invention has been arranged in such that data required for allowance for the use is displayed by a data processing unit wherein storing function and cut & paste function are forbidden with the use of link information of the above described data, the data required for allowance for the use can be embedded in the data prepared by a user himself (herself) while preventing the use without permission of the former data. Furthermore, when data required for allowance for the use is worked, only the data of work information relating thereto can be stored in the present invention, so that the work information made by the user himself (herself) can be utilized without any restriction, besides the use without permission of the original data required for allowance for the use can be prevented. Moreover, since a balance is utilized for a license in case of using data required for allowance for the use in the present invention, a correct charge can be made in response to the amount which has been utilized as to the data.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A data protection system protecting input data requiring authorization for use against unauthorized use during utilization of the input data, comprising:
   means for storing input data, which can require authorization for use;
   means for preparing data to create prepared data by linking the input data to, and/or embedding the input data in, the data using a compound document programming technique to generate information of the input data and to append the generated information to the prepared data;
   means for utilizing the linked and/or embedded input data by displaying the prepared data and the linked and/or embedded input data;
   judging means for judging, using the generated information, whether the linked and/or embedded input data requires authorization for use; and
   means for preventing storage of the linked and/or embedded input data in another storage means to prevent unauthorized use of the linked end/or embedded input data if the linked and/or embedded input data is judged to require authorization for use.

2. The data protection system as claimed in claim 1, further comprising:
   means for executing a cut and paste function with respect to the linked and/or embedded input data in the prepared data; and
   means for preventing the cut and paste function to prevent unauthorized use of the linked and/or embedded input data when the linked and/or embedded input data requires authorization for use.

3. The data protection system as claimed in claim 1, wherein said judging means includes means for judging whether the linked and/or embedded input data in the prepared data is encrypted that can be decoded by a predetermined decoding key; and
   means for determining whether the linked and/or embedded input data requires authorization for use when the linked and/or embedded input data is encrypted.

4. A data protection system for protecting input data requiring authorization for use against unauthorized use when the input data is processed, comprising:
   means for storing input data, which can require authorization for use;
   means for preparing data to create prepared data by linking the input data to, and/or embedding the input data in, the data using a compound document programming technique;
   judging means for judging whether the linked and/or embedded input data requires authorization for use;
   means for preventing storage of the linked and/or embedded input data in another storage means during processing of the linked and/or embedded input data in the prepared data when said linked and/or embedded input data has been judged to require authorization for use; and
   storage means for storing process information indicating what kind of processing has been performed on the linked and/or embedded input data during the processing.

5. The data protection system as claimed in claim 4, wherein said judging means includes means for judging whether the linked and/or embedded input data is encrypted that can be decoded by a predetermined decoding key; and
   means for determining whether the linked and/or embedded input data requires authorization for use when the linked and/or embedded input data is encrypted.

6. The data protection system as claimed in claim 4, wherein the process information is differential data indicating a difference between the linked and/or embedded input data and the linked and/or embedded input data after the processing.

7. The data protection system as claimed in claim 4, further comprising:
   means for displaying the linked and/or embedded input data and the process information as added to the linked and/or embedded input data.

8. The data protection system as claimed in claim 4, wherein said storage means for storing process information includes means for adding information specifying the linked and/or embedded input data to the process information; and
   means for storing the added information.

9. A data protection system for protecting input data requiring authorization for use against unauthorized use, comprising:
   means for storing input data, which can require authorization for use;
   means for permitting distribution of the input data to data processing means;
   means for preparing data to create prepared data by linking the input data to, and/or embedding the input data in, the data using a compound document programming technique;
   judging means for judging that the linked and/or embedded input data in the prepared data requires authorization for use;
   means for preventing storage of the linked and/or embedded input data in another storage means during processing of the linked and/or embedded input data in the prepared data by the data processing means when said linked and/or embedded input data has been judged to require authorization for use; and storage means for storing process information indicating what kind of processing has been applied by said data processing means.

10. The data protection system as claimed in claim 9, further comprising:

means for distributing the data of work information from said center as the one required for allowance for the use thereof.

11. The data protection system as claimed in claim 9, further comprising:

means for distributing the data prepared by adding the data of work information to original data to be worked from said center as the one required for allowance for the use thereof.

12. A data preparation device, comprising:

means for preparing data to create prepared data by linking input data to, and/or embedding the input data in, the data using a compound document programming technique, to generate information of the input data and to append the generated information to the prepared data, the input data requiring authorization for use and input from a center permitting use of the input data in exchange for a charge; and means for utilizing the linked and/or embedded input data by displaying the prepared data and the linked and/or embedded input data.

13. The data preparation device as claimed in claim 12, further comprising:

judging means for judging whether there is a license for utilizing the utilized linked and/or embedded input data in the prepared data; and means for permitting the utilized linked and/or embedded input data to be displayed on said display means when judged that there is the license.

14. The data preparation device as claimed in claim 13, wherein the balance of the charge is used as the license.

15. A data processing device, comprising:

means for permitting distribution to data processing means input data requiring authorization for use in exchange for a charge;

means for processing the input data, which requires authorization for use;

means for preparing data to create prepared data by linking the input data to, and/or embedding the input data in, the data using a compound document programming technique; and storage means for storing process information indicating what kind of processing has been applied by said processing means to the linked and/or embedded input data in the prepared data.

16. The data processing device as claimed in claim 15, further comprising:

judging means for judging whether there is a license for utilizing the linked and/or embedded input data in the prepared data; and means for permitting the processing of the linked and/or embedded input data when judged that there is the license.

17. The data working device as claimed in claim 16, wherein the balance of the charge is used as the license.

18. A data protection system for protecting input data requiring authorization for use against unauthorized use when the input data is processed, comprising:

an input unit inputting input data, which requires authorization for use;

a processing unit in communication with the input unit and applying processing to the input data, which is linked to, and/or embedded in, prepared data according to a compound document programming technique; and a forbidding unit preventing storage of the linked and/or embedded input data during the processing of the linked and/or embedded input data.

19. A method of protecting input data requiring authorization for use against unauthorized use when the input data is processed, comprising:

inputting data as input data, which requires authorization for use;

processing the input data, as linked in compound data in which the input data is linked to data, to produce generated data; and preventing storage of the generated data, which includes the input data, as being processed, in the compound data, during the processing of the input data.

20. A data processing device, comprising:

a storage unit storing input data, which requires authorization for use;

a processing unit in communication with the storage unit and programmed to process the input data, which is linked to, and/or embedded in, prepared data according to a compound document programming technique, to produce differential data by comparing the processed linked and/or embedded input data with the linked and/or embedded input data in the prepared data, and to store the differential data in the storage unit.

21. A method of processing input data requiring authorization for use, comprising:

inputting data as input data, which requires authorization for use, from a center which permits use of the input data in exchange for a charge;

processing the input data as linked in compound data in which the input data is linked to data; and storing process information indicating what kind of processing has been applied by the processing to the input data in the compound data.

22. A system protecting input data requiring authorization for use against unauthorized use during utilization of the input data requiring authorization for use, comprising:

a storage unit storing input data, which can require authorization for use;

a preparation unit in communication with the storage unit and preparing data to create prepared data by linking the input data to, and/or embedding the input data in, the data using a compound document programming technique, to generate information of the input data and to append the generated information to the prepared data;

a data display processing unit in communication with the preparation unit and utilizing the prepared data by displaying the prepared data including displaying the linked and/or embedded input data;

a judging unit in communication with the data display processing unit and using the generated information to judge whether the linked and/or embedded input data requires authorization for use; and a control unit in communication with the judging unit and preventing storage of the linked and/or embedded input data in another storage unit to prevent unauthorized use of the linked and/or embedded input data if the linked and/or embedded input data is judged to require authorization for use.

23. A computer system protecting input data of a compound document against unauthorized use during utilization of the input data, comprising:

a display unit;

a processing unit; and a computer readable storage controlling the processing unit according to a process of:

determining based upon information of input data embedded and/or linked in a compound document created according to a compound document standard if the input data requires authorization for use in response to a request to display the compound data on the display unit;

displaying the input data on the display unit in response to received authorization if the input data requires authorization for use; and forbidding storage of the input data if the input data requires authorization for use to prevent unauthorized use of the input data in the created compound data.

* * * * *

UNITED STATES PATENT AND TRADEMARK OFFICE
CERTIFICATE OF CORRECTION

PATENT NO. : 6,829,592 B1
APPLICATION NO. : 09/000924
DATED : December 7, 2004
INVENTOR(S) : Takayuki Hasebe et al.

It is certified that error appears in the above-identified patent and that said Letters Patent is hereby corrected as shown below:

On the Title Page, item [56]: Column 2, under FOREIGN PATENT DOCUMENTS, insert

```
-- JP   7-30244     11/1995
   JP   8-185448    7/1996
   JP   8-292976    11/1996
   JP   8-329011    12/1996
   JP   8-255132    10/1996
   JP   3-35351     2/1991 --.
```

Signed and Sealed this

Seventh Day of April, 2009

JOHN DOLL
*Acting Director of the United States Patent and Trademark Office*